United States Patent [19]
Taylor

[11] Patent Number: 6,161,218
[45] Date of Patent: *Dec. 12, 2000

[54] SOFTWARE PATCH ARCHITECTURE

[75] Inventor: Julian S. Taylor, Colorado Springs, Colo.

[73] Assignee: Sun Microsystems Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/587,284

[22] Filed: Jan. 16, 1996

[51] Int. Cl.[7] .................................................... G06F 9/445

[52] U.S. Cl. ................................... 717/11; 717/4

[58] Field of Search ...................... 395/712, 707, 395/704; 717/12, 7, 4

[56] References Cited

U.S. PATENT DOCUMENTS

| | | | |
|---|---|---|---|
| 5,274,808 | 12/1993 | Miyao et al. | 395/712 |
| 5,450,589 | 9/1995 | Maebayashi et al. | 395/703 |
| 5,577,244 | 11/1996 | Killebrew et al. | 395/703 |
| 5,586,304 | 12/1996 | Stupek, Jr. et al. | 395/712 |
| 5,794,052 | 9/1998 | Harding | 395/712 |

*Primary Examiner*—Majid Banankhah
*Assistant Examiner*—Peter Stecher
*Attorney, Agent, or Firm*—Holland & Hart LLP

[57] ABSTRACT

A software package installed on a UNIX system V computer system is repaired by installing a System V software patch package. During installation of the patch package using the pkgadd utility and scripts in the patch package, a backout software package is constructed. This backout package will, when later installed on the computer system using pkgadd, operate to restore the software in the computer system to its original state before installation of the patch package.

12 Claims, 6 Drawing Sheets

SOFTWARE PATCH ARCHITECTURE

BACKGROUND OF THE INVENTION

1. Field of the Invention

This invention pertains to the field of digital computers, and more specifically to apparatus/methods for repairing computer software products that are in the possession of a user, i.e. software products that are in the field and installed on a computer system.

The present invention relates generally to an apparatus/method that provides for the repair of software that is written for use with the UNIX operating system, and more specifically UNIX System V, and UNIX System V, release 4. While the invention will be described with reference to the UNIX System V operating system, in its broader aspects the invention is not to be limited thereto. UNIX System V software products are prepared in accordance with package formats that are defined by the Application Binary Interface (ABI) that is a supplement to the System V Interface Definition (SVID). Software products in this ABI format are called packages.

Incorporated herein by reference are the following UNIX System V documents; (1) System V Definition, AT&T, a five volume publication by Prentice Hall, and (2) System V Application Binary Interface, AT&T, a publication by Prentice Hall.

2. Description of Prior Art

Installed software products, also called packages, often need to be repaired after the products have been delivered to a user and are installed on a computer system. This repairing operation is accomplished using what is known in the art as a software patch, or more simply, a patch.

A software patch comprises a sparse software package that is designed to overwrite certain files that exist in an original software package. The primary reason for shipping a patch containing sparse packages to existing users of the software package is to save space on the delivery medium such as a floppy disk. In the alternative, it is possible to ship the entire original package wherein the new files are different, and then use the pkgadd utility to install only the different files.

A patch must not change the intended delivered behaviors of the package being repaired; i.e., a patch is not a mechanism for installing new features. This can be done by keeping track of the patch status of the software package by using a System V pkginfo file entry which augments the package VERSION such as PATCH=010456-03.

If the software system is complex, it is wise to establish a patch identification system that will assure that no two patches can replace the same file, for example in an attempt to correct two different aberrant behaviors. In some cases it may be desirable to back out an installed patch, for example when a user prefers the original software package with its "defect".

If installation of the patch is not adequate, subsequent removal of the patch from the installed software must restore the file system to it's original state. This restoration requirement is often not possible, and the present invention is directed to solving this problem.

As is well known by those of skill in the art to which the present invention pertains, the UNIX System V operating system offers program administrators clearly defined behaviors when using the known System V utilities pkgadd (package add) and pkgrm (package remove). As is well known, pkgadd operates to add a software product, or package, to a computer system, whereas pkgrm operates to remove an installed software package from a computer system.

Figure 1:
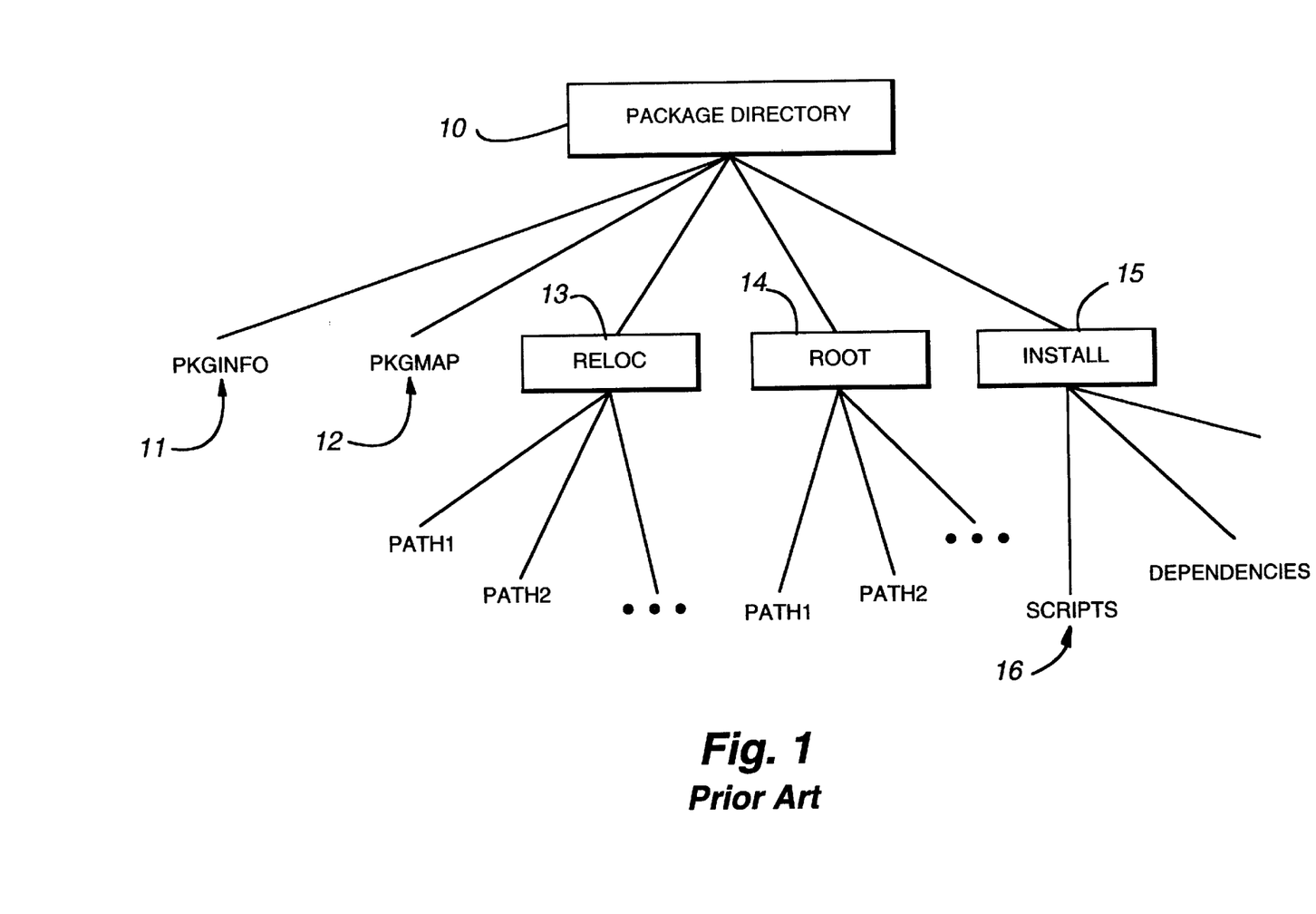
FIG. 1 shows the UNIX SYSTEM V, Application Binary Interface (ABI) package format.
Figure 2:
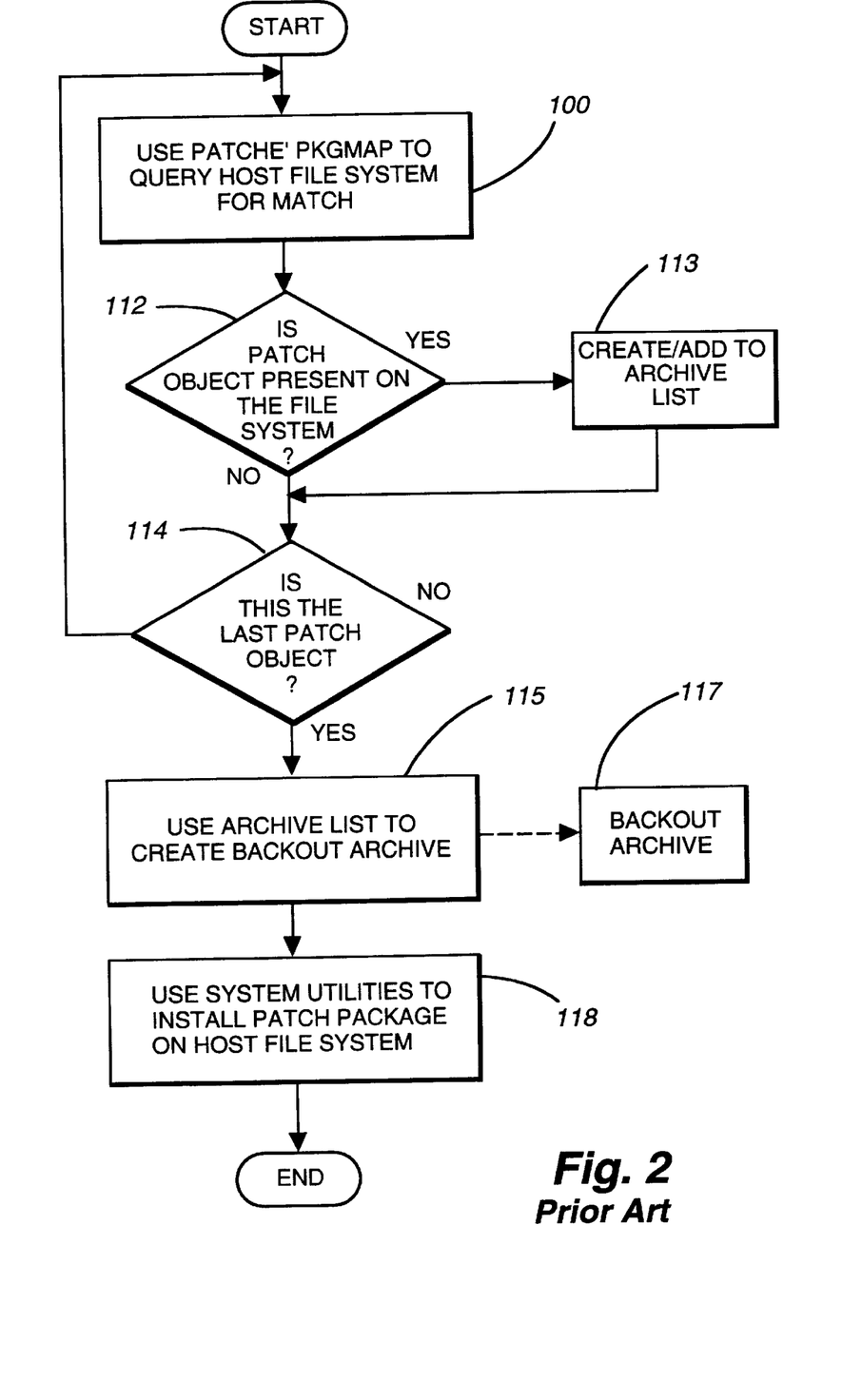
FIG. 2 shows a representative prior art operation for installing a software patch on a host file system.
Figure 3:
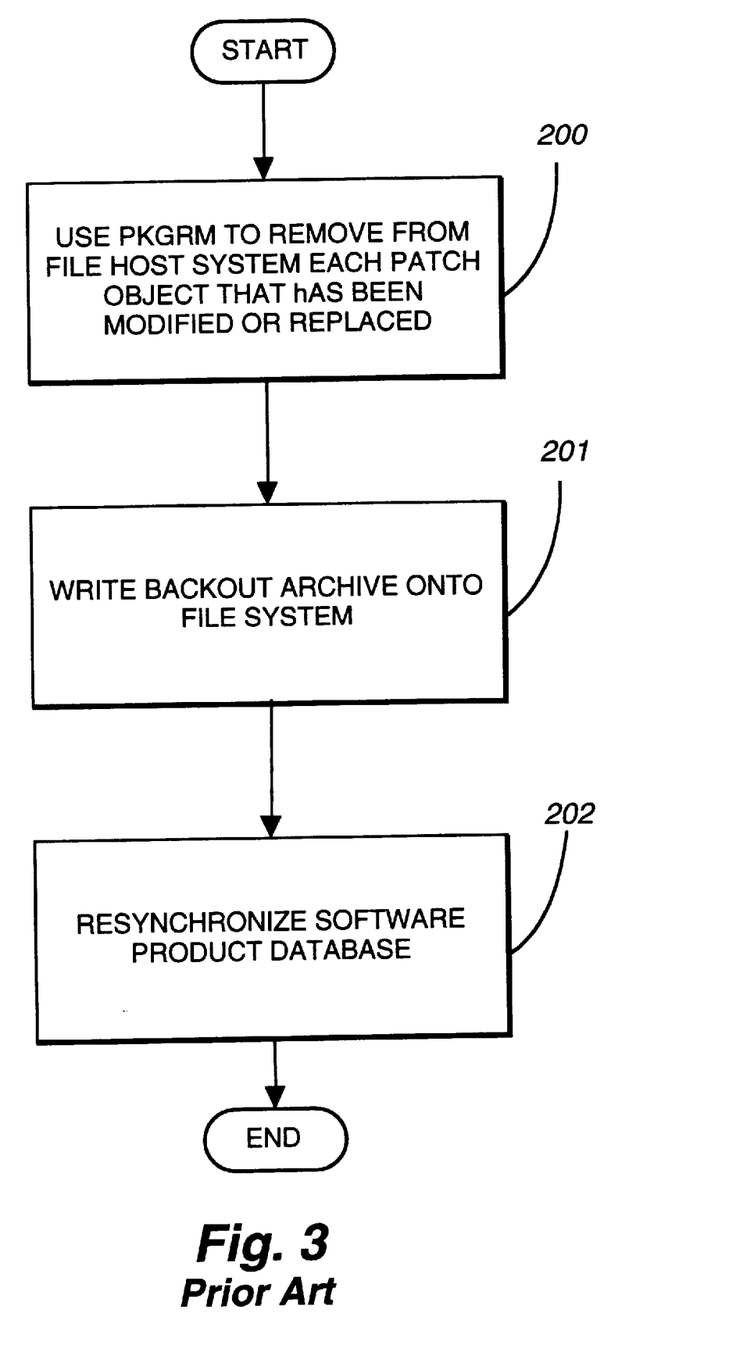
FIG. 3 shows a prior art operation to install the archive list of FIG. 2 on the host file system to restore the original installed software packages when the installed patch did not work as intended on the host system.

FIG. 1 through FIG. 3 illustrate the format for UNIX System V software packages defined by the Application Binary Interface (ABI) and conventional operations for patching software in UNIX System V. The standard UNIX System V ABI format is shown in FIG. 1. Number 10 represents a package's directory that contains package files. The name of directory 10 must be the same as the package name; for example, a package named SUNWcsu is comprised of a directory 10 named SUNWcsu and its contents. Within directory 10 are pkginfo file 11 and pkgmap file 12, as well as whatever other files are necessary to make up the package. Pkginfo file 11 describes the package as a whole, including special environment variables and installation directives. Pkgmap file 12 resembles a packing list in that it describes each object that is to be installed, examples of objects being file, directory, named pipe, etc.

Reloc directory 13 of FIG. 1 is a directory that contains the files and directories to be installed relative to the base directory defined in pkginfo 11, that is, the relocatable objects. Root directory 14 is a directory that contains files and directories to be installed relative to the root directory of the UNIX file system, that is, the root objects. Install directory 15 is a directory that contains scripts (UNIX shell programs) 16 and other auxiliary files.

The well-known System V ABI of FIG. 1 allows any file within a package 10 to be assigned to a class. All files that are within a specified class may then be installed to a disk using a method that is defined by a "class action" script 16. A System V package may make use of several shell scripts 16 which perform specific tasks during installation of the package objects. All scripts 16 are Bourne shell scripts.

The only required objects in a package are that of pkgmap 12 and the pkginfo 11. Once the directory-format package in accordance with FIG. 1 is constructed, it can be combined with other packages into a single stream-format package. This stream-format package can then be processed by the System V pkgadd utility.

The following System V utilities are used to manipulate packages:

"pkgadd" is used to install a package onto a host;

"pkgask" is used to dry-run the first part of a package installation for replay to a non-interactive pkgadd utility;

"pkgtrans" operates to transfer a package from one location to another, and to optionally translate the package to or from stream-format;

"pkgrm" operates to remove a package from the file system;

"installf" incorporates a new package object into a package that is already installed on the file system;

"removef" removes a package object from an installed package;

"pkgchk" verifies the integrity of a package in either installed or package form;

"pkginfo" returns information about a package;

"pkgparam" returns specific attribute values of a package;

"pkgmk" creates a package from a prototype file and a set of source trees; and

"pkgproto" creates a prototype file for use by "pkgmk".

FIG. 2 is a showing of a representative prior art means for installing a software patch on a host file system, and creating archive list 113 of FIG. 2 during this patch installation process. In FIG. 2, operation block 118 operates to install the software patch. As is well known, a software patch can consist of one or more patch packages, and a package can consist of one or more objects.

The first operation 100 that was performed in this prior system was to use the patch's pkgmap to query the host file system for a match to all of the patch objects that are within the patch to be installed. As is apparent to those of skill in the art, not all objects within a patch correspond to those that are within the file system; i.e., the patch object may be a new object.

Thus, decision operation 112 sequentially operates on all patch objects to determine if a correspondence has been found, and if the answer is "yes", then operation 113 operates to add each such existing file system object to an archive list. In this case, the process continues on to decision operation 114 whereat it is determined if the last patch object has been operated upon by operations 100, 112.

In the event that decision operation 112 determines that correspondence does not exist for a given patch object; i.e., the patch object is a new object that is to be installed on the host file system, then operation 114 is enabled by the "no" output of decision operation 112.

When all patch objects have been acted upon, and thus a complete archive list 113 has been compiled, operation 115 is enabled to use this archive list and create a backup archive that consists of all file system objects that are to be modified or replaced by installation of the patch. This backup archive may be a cpio archive, and it is represented by block 117 in FIG. 2.

As the last operation of FIG. 2, operation 118 is enabled to use the System V utility pkgadd to install the patch on the file system.

FIG. 3 shows a prior art means that operates to install archive list 113 of FIG. 2 on the host file system when operation of FIG. 2 has been faulty; i.e., when the installed patch did not work as intended on the host file system. As is well known, patch developers/manufactures extensively test their patches before delivery. However, in some cases the software product will not operate properly after a patch is installed. For example, the patch may not work properly with other patches that have been previously installed on the software product.

In this case, operation 200 operates to remove from the host file system each patch object that has been modified or replaced.

It is important to note that operation 200 does not remove from the host file system patch objects that were newly installed on the host file system by installation of the patch as shown in FIG. 2. The System V utility pkgrm may be used to perform operation 200.

In operation 201, archive list 113 is used to write the backout archive onto the host file system, thus restoring the host file system to the state in which it existed prior to the install-patch operation that is shown in FIG. 2, with the notable exception that patch objects that were newly installed on the host file system are not removed by operation of operation 201. The present invention overcomes this significant deficiency in the prior art.

Once operation 201 is accomplished, operation 202 operates to resynchronize the database of the software product. The System V utility pkgchk can be used with the "-f" option (pkgchk-f) to accomplish operation 202.

SUMMARY OF THE INVENTION

In accordance with this invention, the above problems have been solved by installing with an installation utility a patch package to repair the installed software and by creating a backout package during installation of the patch package. The installation utility installs package objects from the patch package to a target package of the installed software by executing scripts in the patch package and creates the backout package also by executing scripts in the patch package and by inserting second scripts in the backout package. The backout package, if later installed on the computer system by the installation utility, will remove the patch from the target package of installed software and restore the installed software to its original state.

The present invention operates during installation of a UNIX System V patch package to construct another System V software-restore package which will, when run, undo the changes that have been made during installation of the patch package. More specifically, operation of the present invention occurs during use of the System V pkgadd utility to install a patch. During installation of the patch, the invention constructs a software-restore package that retains all data about each package object that is being added, deleted or modified in the original package being patched.

In the event of a problem with the software being patched, the original software package is restored by a subsequent installation of this restore-package by operation of the System V pkgadd utility, and installation of this restore-package operates to restore the system to its original state.

Apparatus for repairing installed software on a computer system has a "patch install" module that installs a patch package to repair a target package of the installed software and a "build backout" module that creates and saves a backout package during installation of said patch package by said patch install module. The backout package is used subsequently to restore the target package to an operative state identical to operation of the installed software before installation of the patch package.

As a further feature of the invention a validation module detects if the target package has been repaired and indicates a failed patch if the installed software does not operate correctly after the "patch install" module installs the patch package. In the event the patch failed or the installed software does not operate correctly after the patch, a "backout install" module installs the backout package to restore the target package.

The specific utility of this invention is to provide in a computer system for the repair of a software product that was originally installed on the computer system using a package-add utility, by installing the software patch package on the computer system, and during this installation, constructing a backout, or restore-software, package which, when later installed on the computer system using the same package-add utility, operates to remove the patch package.

One significant advantage of the invention over the prior art as exemplified by FIGS. 2 and 3, is the simplification of a restore process. In order to accomplish the restoration of installed software from archive list 113 on the host file system when operating in the prior art as shown in FIG. 2, all four of the UNIX System V utilities pkgadd, pkgrm, pkgchk and cpio are required. The present invention requires use of only the pkgadd utility in order to restore the installed software.

The foregoing and other features and advantages of the invention will be apparent from the following more particular description of a preferred embodiment of the invention as illustrated in the accompany drawings.

DESCRIPTION OF THE PREFERRED EMBODIMENT

Figures 4, 5:
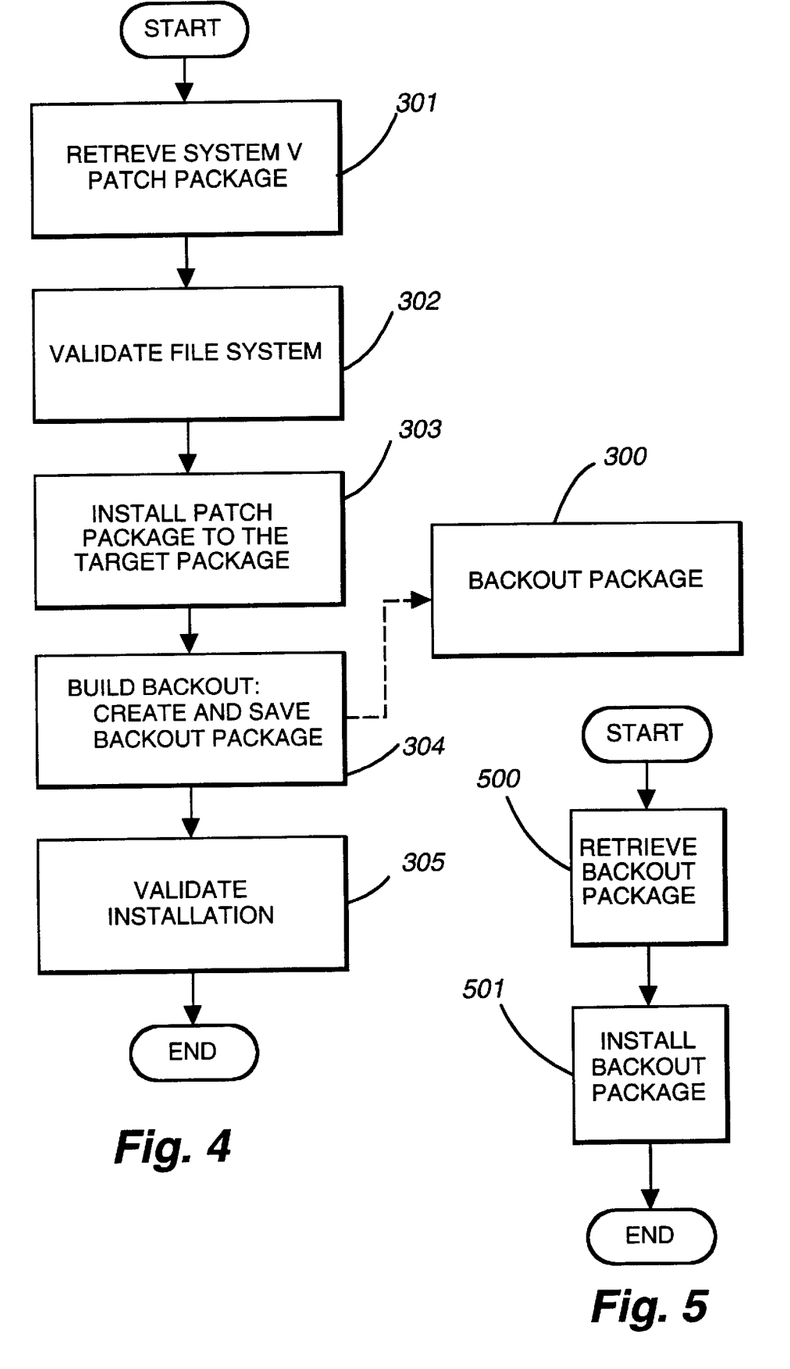
FIG. 4 illustrates a preferred embodiment of the present invention that operates during the installation of a UNIX System V software patch onto a UNIX System V software product to create a System V restore-software package i.e., backout package.
FIG. 5 illustrates a preferred embodiment of the invention using the backout package created in FIG. 4 to restore the computer system to its original state.

In FIG. 4 the logical operations to install a patch package onto a target package of installed software begin with operation 301 retrieving the UNIX System V patch package. During installation of this patch package, a restore-software package 300 (i.e. backout package) is created. In the event, the installation of the patch package is not successful, the backout package 300 will, when later installed on the computer system using pkgadd, operate to restore the software in the computer system to its original state, i.e. before installation of the patch.

Installation of the software patch package occurs in operation block 304 of FIG. 4. As will be remembered, a backout package can consist of one or more packages, and each package can consist of one or more objects. In FIG. 4, it will be assumed that the backout package comprises one package. If the backout package consisted of more than one package, then the process of FIG. 4 would be repeated for each of the packages within the backout package.

It is important to note that backout package 300 has all of the attributes of the well known System V software packages, and that during installation of backout package 300 on a computer system using the pkgadd utility, i.e. during the process of backing out the prior installed patch to which backout package 300 is related, backout package 300 performs all of the known attributes of a System V software package, thereby enabling the swift and accurate restoration of the computer system to its original state.

As the first operation in the process of FIG. 4, a System V patch package to be installed on the computer system (shown in FIG. 6 for example) is retrieved at operation block 301. The System V utility pkgadd now operates at operation block 302 to validate the file system of the retrieved patch package.

Once this has been accomplished, patch install operation 303 installs the patch package onto a target package of installed software in the System V computer system. Build backout operation 304 operates to create and save backout package 300. During installation of the patch package, the System V utility pkgadd operates to first execute scripts that are present within the patch package in the following order—request script, checkinstall script, and preinstall script. For each class of objects that are in the patch package, pkgadd executes the class action script in the patch package for those objects. Finally, pkgadd executes the postinstall script. Operations 303 and 304 while installing the patch are also building the backout package at the same time. Operations 303 and 304 are described in detail hereinafter with reference to FIG. 7.

At validation module 305 the installation operation 303 is verified, whereupon the FIG. 4 process ends. Validation module detects if the target package has been repaired. The validation module can also be used to detect if installed software is operating correctly after the target package is patched. It is possible that software outside the target package may fail because of the change to the target package. This may be detected much later after the patched software has been used for sometime.

In the event that the backout package contained more than one package, the FIG. 4 process would be repeated for each such additional package. If the validate operation 305 can not verify or validate that the installation was successful, the target packages, that were patched, must be restored to their original state. FIG. 5 illustrates operations to restore these patched target packages.

In FIG. 5, as the first step of this restore operation, retrieve operation 500 retrieves the one-package backout package 300 that was created by operation 304 of FIG. 4. In backout install module 501, the pkgadd utility operates to install this backout package on the computer system. In module 501 the System V utility, pkgadd, executes the patch_checkinstall script and then the patch_postinstall script within the retrieved backout package. The execution of these scripts operates to fully restore the prior-patched System V software to its original state, i.e. its pre-patch state. Operation 501 is described in detail hereinafter with reference to FIG. 8.

After backout installation operation 501, this completes the software restoration based on the one-package backout package 300. Of course, had the backout package consisted of more that one package, then the FIG. 5 operations would be repeated for each such additional package.

Figure 6:
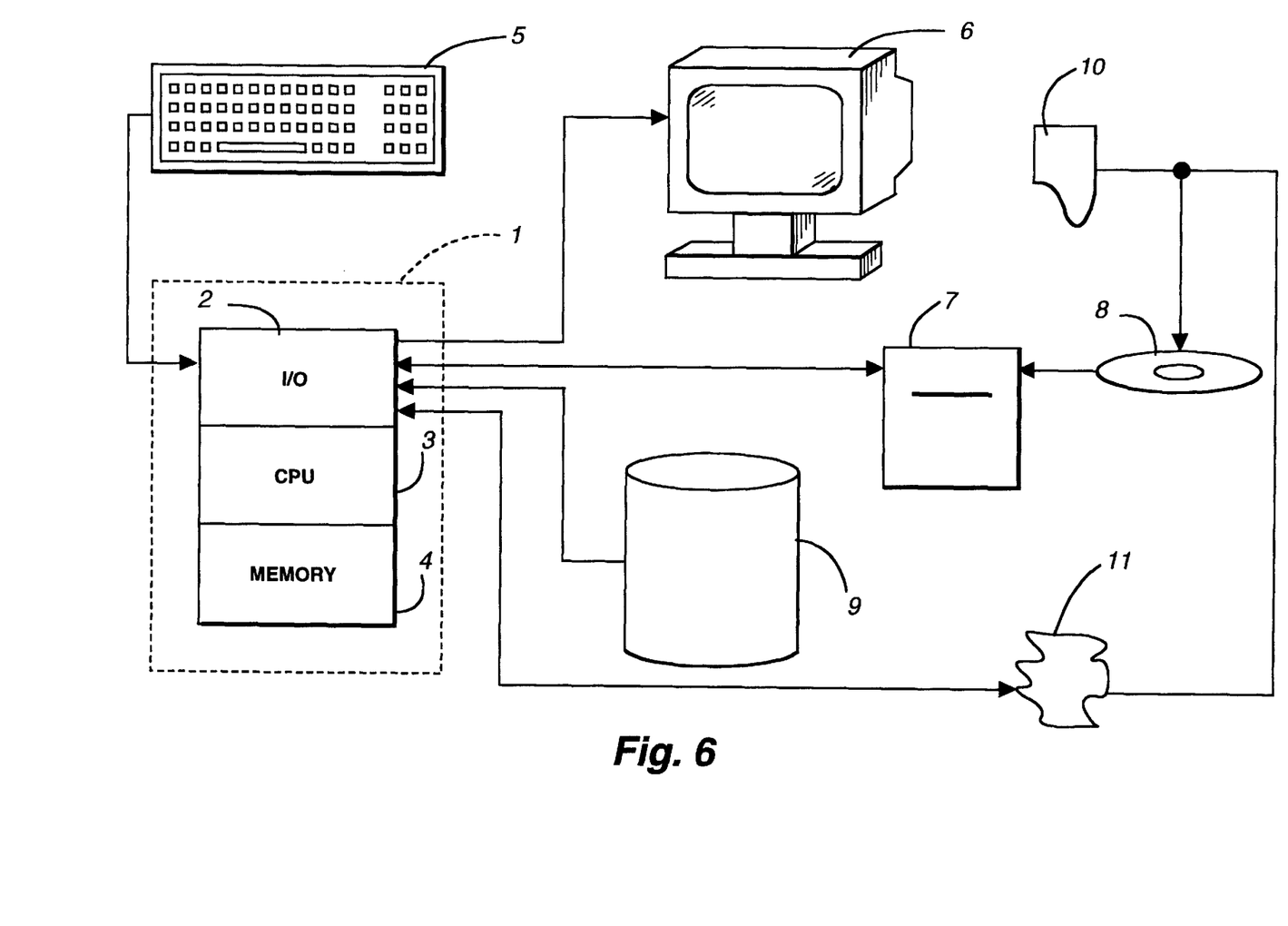
FIG. 6 shows the environment in which the present invention is operated, which environment encompasses general distributed computing systems.

FIG. 6 shows the environment in which the present invention is used, and encompasses general distributed computing systems, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output (I/O) section 2, a Central Processing Unit (CPU) 3 and a memory section 4. The I/O section 2 is connected to a keyboard 5, a display unit 6, a disk storage unit 9, a CD-ROM drive unit 7, and a network interface 11. The CD-ROM unit 7 can read a CD-ROM medium 8 which typically contains programs 10 and data. The network interface 11 also provides programs 10 and data. The computer program products containing mechanisms to effectuate the apparatus and methods of the present invention may reside in the memory section 4, or on a disk storage unit 9, or on the CD-ROM 8 of such a system, or on a separate computer called a server made available over the network 11.

While patch behavior can be manifested in a number of ways, the patch package is built with a buildpatch utility that provides a set of tested package scripts which support all requirements of this patch architecture. As discussed above seven scripts are used in this patch architecture approach. This architecture does not require that these particular scripts be used, but any delivered patch package and any created backout package must exhibit patch behavior described herein and these scripts do that. The operations of five of these scripts to install the patch package and to create the backout package are described in reference to FIG. 7. The operations of two of these scripts to backout the patch are described in reference to FIG. 8.

Figure 7:
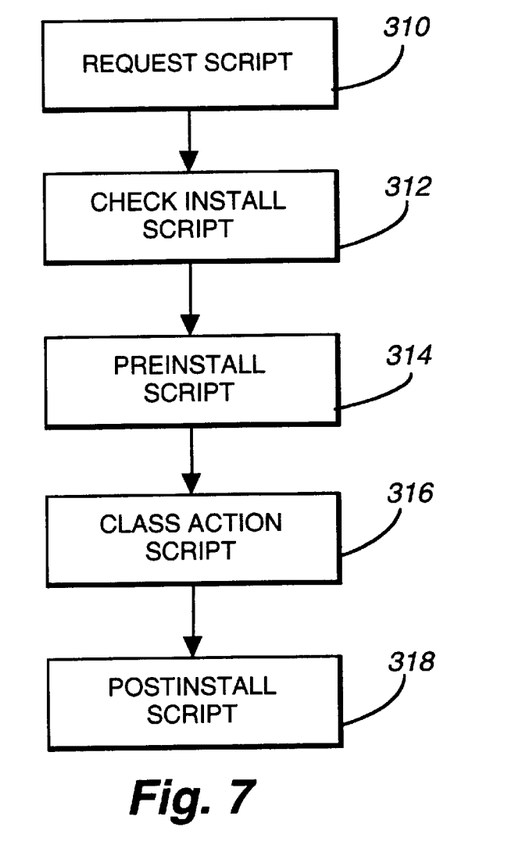
FIG. 7 illustrates the operations executed in performing operations 303 and 304 of FIG. 4 to install a patch package and create a backout package.

In FIG. 7, the installation of a patch begins with pkgadd executing the request script module 310. The purpose of the request script is to determine user preferences regarding backout and validation. If backout is not desired, the script will write "PATCH_NO_UNDO=true", to a response file. The response file is a control file whose functionality is defined in the System V Interface Definition. If backout is desired, the request script may write out "PATCH_NO_UNDO=", or it can simply exit without defining the parameter.

The checkinstall script 312 in the patch package is executed next by pkgadd. It is the job of this script to verify that it's OK to install the patch. If the patch should be installed, the script exits with code 0. If it should not be applied, an exit code of 3 will cause the pkgadd to suspend without modifying the filesystem.

Checkinstall script 312 performs the following tasks in the following order.

First, determine if the target package is already installed. If the environment parameter UPDATE exists, then the target package is present. If it does not exist, then the script must provide a meaningful message and exit.

Second, determine if this is a restricted patch (a restricted patch is an emergency patch provided without any assurance of reliability). If the patch number includes the string identifying this as a restricted patch, then backout behavior is enabled by writing "PATCH_NO_UNDO=" out to the response file.

Third, scan all patches in the target package's PATCHLIST. Analyze each entry in the list. Print an appropriate message and exit if one of the following cases is detected:
 a. a restricted patch is found
 b. a newer version of this patch has been installed
 c. this patch is already installed and PATCH_UNCONDITIONAL!="true".

Fourth, add this patch number to the list of applied patches.

Fifth, construct a complete, non-duplicating list of patches that this patch obsoletes along with counts of applied obsoleting patches. Obtain the list of obsoleted packages from the target package and merge this with the PATCHLIST parameter.

Sixth, determine if this patch is obsoleted by a prior installed patch.

Seventh, determine if this patch is incompatible with already installed patches.

Eighth, determine if this patch requires a patch that is not installed.

Ninth, publish the script directory.

The preinstall script module 314 does nothing unless "$PATCH NO UNDO" ="" or is undefined. By default this script initializes the directories and metadata for the backout package. Since this script is executed with root authority as required by the System V ABI, it can create directories and copy files anywhere it wants to. As described herein a few parameter names are used throughout; they are as follows:

BUILD_DIR is the directory where the pkginfo file, prototype file and all of the source files will be stored for the purpose of building the backout package (usually /var/tmp/$PKGINST).

FILE_DIR is the directory where the source files and scripts are stored (usually $PATCH_BUILD_DIR/files).

RELOC_DIR is the directory in which relocatable build objects are stored (usually $FILE_DIR/reloc).

ROOT_DIR is the directory in which absolute build objects are stored (usually $FILE_DIR/root).

PROTO_FILE is the name of the prototype file (usually $BUILD_DIR/prototype).

PKGINFO_FILE is the name of the pkginfo file (usually $BUILD_DIR/pkginfo).

BO_Deletes is the file containing the new objects in the patch which will be deleted at backout time (usually $FILE_DIR/deletes).

Preinstall script 314 first uses pkgparam -v $PKGINST to acquire the environment of the target package of the installed software. The environment information will be transferred to the backout package 300. Several environment entries may be included in the output of this command which will not be useful in the backout package and they need to be filtered out. The parameters to be omitted are as follows:

PATCHLIST
PATCH_OBSOLETES
ACTIVE_PATCH
opt_idPATCHID
UPDATE
SCRIPTS_DIR
PATCH_NO_UNDO
INSTDATE
PKGINST
OAMBASE
PATH With the exception of these entries, all other entries are put into the pkginfo file for the backout package.

Next, the backout package prototype file is initialized with the pkginfo file just constructed using a line of the form:
 echo "i pkginfo">$PROTO_FILE.

The $SCRIPTS_DIR directory defined above is the source of the next entries. All files in $SCRIPTS_DIR whose names begin with "u." are entered into the prototype file with the "u." converted to an "i." to make it an install class action script. All files whose names begin with "patch_" are entered into the file with the string "patch_" stripped from the file name.

So, if the patch package contains a file called "u.server" and if $FILE_DIR="/var/tmp/mumble/files", the following entry is made in $PROTO_FILE
 "i i.server=/var/tmp/mumble/files/i.server".
Then the file is copied into $FILE_DIR with the command
 "cp $SCRIPTS_DIR/u.server $FILE_DIR/i.server".

Figure 8:
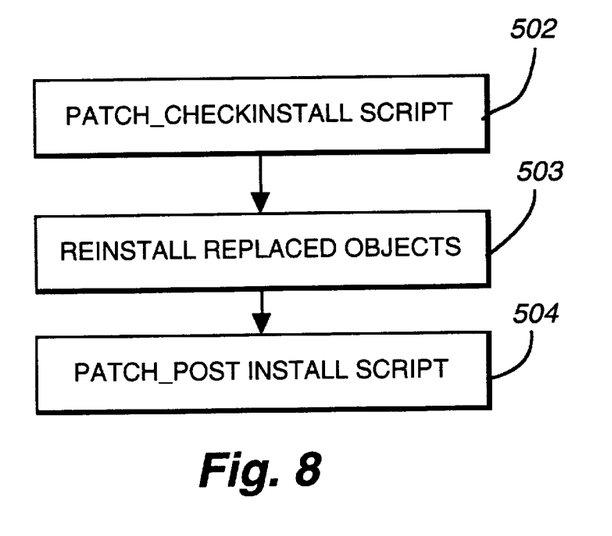
FIG. 8 illustrates the operations executed in installing the backout package to restore software.

The patch-postinstall script module, described hereinafter in FIG. 8, is copied into $FILE DIR as postinstall and the corresponding entry made in the prototype file. All such "u." and "patch_" files in $SCRIPTS_DIR are copied into a build area in this way.

'Next, all non-files are accounted for by the preinstall script module 314. The pkgmap of the patch package is scanned for symlinks, hard links, named pipes and devices. Those entries are then entered into the prototype file. These objects are processed in the preinstall script because they are not passed to a class action script. At install time, shortly after the preinstall script exits, and just before the actual files are installed, all symlinks, named pipes and devices are created by pkgadd. Hard links are created after all files have been installed. Since only the regular files are dealt with in the class action scripts, preinstall script 314 records these non-files.

For each of the objects, it is determined if they will be replacing an object that is already in place on the target host. If the object is replacing something, the object that is currently in place is evaluated using pkgproto and entered into the prototype file. This prototype file is a list of everything that needs to be put back in the event that a backout is required. For that reason, prototype file is made up of objects that are already on the file system. For each currently installed object entered into the prototype file, it is copied to $FILE_DIR for incorporation into the backout package.

If the object being installed by the patch is not replacing an existing object, it is listed on the $BO_Deletes file. At backout time, these files will be removed from the file system.

The class action script module 316 is the same for all classes. The class action script for each included class is responsible for installing each of the new files. Only real files are installed by the class action script. Every non-file object is dealt with elsewhere.

Just like in the preinstall script no backout package is produced if "$PATCH_NO_UNDO" ="true". If it is not, then those already installed objects that are replaced by a file are entered into the prototype file and if they were regular files at the time, they are copied into $FILE_DIR. If the new file is not replacing anything, then it is entered into the $BO_Deletes file for deletion at backout time. The class action script is also used to scan for and preserve essential dynamic libraries.

The class action script may attempt to replace a common shared library that is required for proper execution of the class action script. These libraries need to be detected and dealt with specially. A list of these libraries is constructed first for reference during the actual file-replacement phase of the script. When this is finished, $LIB_LIST is a list of libraries which, if replaced with impunity, would cause the class action script to abort prematurely and leave the host computer potentially unusable.

In order to assure that an executable or dynamic library doesn't come up short when some other process wants it during the patch, all files should be replaced in the following way. First, copy the source file to a temporary location in the same directory as the target. Second, if the copy returned no error code use mv to atomically replace the target with the temporary file. Third, if the copy returns an error code, remove the temporary file and continue. Even if there is a serious error in the installation, it is important to continue so that what has been done can successfully be undone by the backout package 300 produced in the postinstall phase.

The postinstall script module 318 checks for existence of a deletes file and if it finds it, it records it in the prototype file. Once that is complete, it scans the deletes list provided with the patch (the files that this patch deletes). For each entry in that deletes list, an entry is made in the prototype file corresponding to the file being deleted, that file is copied to $FILE_DIR and then deleted from the filesystem. The removef utility is used to update the installed database with the file removal.

With that complete, the postinstall script 318 now creates the backout package and transfers it to the save directory iff "$PATCH_NO_UNDO"="". That requires three commands like this:

cd $BUILD_DIR
pkgmk -d $PKGSAV -r $FILE_DIR pkgtrans -s $PKGSAV $PKGSAV/$Patch_label/undo $PKG With the undo file (a stream-format backout package) complete and optionally compressed, the postinstall script 318 deletes $BUILD_DIR and then goes to each available backout package which this patch obsoletes and renames the file from "undo" to "obsolete". Postinstall then does the same to the backout packages for the prior versions of the patch package (same patch code but lower version number). This completes the patch package installation.

If the validate installation operation 305 in FIG. 4 detects that the installation of the patch package was not successful or that the installation has otherwise produced unexpected and undesirable effects on the software, it is necessary to restore the software to its original state. After operation 500 in FIG. 5 retrieves backout package 300, the installation of the backout package is accomplished by pkgadd executing the backout package as shown in FIG. 8.

In FIG. 8 the patch_checkinstall script module 502 is the first to be executed. Patch_checkinstall first determines that no later version of this patch has been installed on the host. If a later version has been installed, the backout cannot proceed, and the patch_checkinstall script causes pkgadd to exit.

If patch_checkinstall script 502 does not detect a later version of the patch installed, script 502 then constructs a PATCHLIST identical to that of the target package as currently patched but excludes the patch being backed out from the list. The modified PATCHLIST is put into the response file by script 502. It then sets $Patch_label to null and inserts that into the response file as well.

Further, patch checkinstall module 502 restores the environment parameters and non-file objects of the target package from the environment parameters and non-file objects stored in the backout package.

These parameters and objects were acquired for the backout package by preinstall module 314 (FIG. 7) and loaded in the backout package by postinstall module 318 (FIG. 7).

Finally, patch_checkinstall script 502 updates the PATCH_OBSOLETES parameter based upon the delivered obsoletes list. Next the patch postinstall script 504 is executed by pkgadd.

The reinstall module 503 uses the pkgadd utility to reinstall the files or program objects copied into the backout package when such files were replaced by replacement files from the patch package. Module 503 reads these replaced files and overwrites them back into the target package over the replacement files placed in the target package by installation of the patch package.

The first thing the patch postinstall script module 504 does is to delete all the files enumerated in the Deletes file. The Deletes file is a list of deletable files or objects that were newly added to the target package by the patch package. To finish restoring the target package to its condition before the patch, module 504 deletes the deletable files from the target package. It then scans the installed packages for backout packages that are no longer obsolete, now that this patch has been removed. It renames those backout packages from "obsolete" to "undo" and that completes the backout of the original patch.

While the invention has been particularly shown and described with reference to a preferred embodiment thereof, it will be understood by those skilled in the art that various other changes in the form and details may be made therein without departing from the spirit and scope of the invention.

What is claimed is:

1. A method of repairing installed software having existing program objects on a computer system having an installation utility for adding a software package to the system, said method comprising the steps of:

installing with the installation utility a patch package to repair the installed software, the patch package including selectively replacing program objects and new program objects, the replacing program objects replace existing program objects and the new program objects install new program objects to the installed software, said installation utility installing patches from the patch package to a target package of the installed software by executing first scripts in the patch package;

creating a backout package during installation of said patch package, the backout package selectively including both replaced existing program objects and a delete new program objects identifier list, said installation utility creating the backout package by executing said first scripts in the patch package and by inserting second scripts in the backout package;

said first scripts, when executed, adding replaced existing program objects to the backout package, said replaced existing program objects being existing program objects selectively replaced by replacing program objects in the patch package;

said first scripts also adding new program object identifiers to said delete new program objects identifier list in the backout package, said delete new program objects identifier list identifying new program objects that are new to the installed software;

determining if said installation of said patch package has been successful by detecting whether the installed software is operating correctly; and in the event that said installation of said patch package has not been successful, installing the backout package to remove the replacing program objects from the target package and installing the selectively replaced existing program objects to the target package and to remove new program objects identified on the delete new program objects identifier list from the target package to restore the target package to an original state, said installation utility installing the backout package by executing said second scripts in the backout package.

2. The method of claim 1 wherein said step of installing the backout package comprises the steps of:

restoring the environment of the target package to a state prior to installation of the patch package;

installing with the installation utility said selectively replaced existing program objects from the backout package; and deleting from patched software the new program objects identified on said delete new program objects identifier list of the backout package.

3. The method of claim 1 wherein said step of installing the patch package comprises the steps of:

checking the installed software on the computer system to verify that the target package of the installed software is on the computer system; and adding patch files form the patch package into the target package by executing a class action script, said patch files including new program objects to be added to the target package and replacing program objects to replace existing program objects in the target package.

4. The method of claim 3 wherein said creating step comprises the steps of:

acquiring environment parameters of the target package and putting the environment parameters into a package information file, copying the package information file and non-file objects of the target package into a prototype file, and copying the second scripts into the prototype file;

putting a list of the new program objects in a deletes file and recording the deletes file in the prototype file;

entering a deletes list from the patch package into the prototype file, the deletes list being a list of the existing program objects replaced by the replacing program objects; and moving files on the deletes list from the target package to the backout package and saving the prototype file to the backout package.

5. The method of claim 4 wherein the steps of said creating step are performed only if a step of requesting user's preference regarding backout of the patch package indicates a backout package is to be built during installation of the patch.

6. Apparatus for repairing installed software having existing program files on a computer system, said computer system having a processor, a keyboard and a plurality of data storage devices, said processor having a central processing unit, memory and input/output control, said input/output control connected to said keyboard and to said data storage devices, said apparatus comprising;

a patch install module configured to install a patch package to repair a target package of said installed software by selectively repairing existing program files and by new program files, said patch install module installable by an installation utility;

a build backout module configured to create and save a backout package during installation of said patch package by said patch install module, said backout package selectively including both pre-repaired existing program files and a delete new program files identifier list, the delete new program files identifier list identifying program files new to the installed software;

said backout package for subsequent use in restoring said target package to an operative state that is identical to operation of said installed software before installation of said patch package;

said subsequent use of said backout package operating to selectively restore said pre-repaired existing program files and operating to remove said new program files identified on the delete new program objects identifier list;

a validation module configured to detect if the target package has been repaired and indicating a failed patch if the installed software is not intact after said patch install module installs the patch package by detecting whether the installed software is operating correctly; and a backout install module, responsive to said failed patch, configured to install said backout package to restore said target package, said backout install module installable by the installation utility used also to install said patch install module.

7. The apparatus of claim 6 wherein said patch install module comprises;

a check install module configured to detect the target package of the installed software is on the computer system and indicating target package present; and a class action module, responsive to target package present, configured to install the patch package into the target package.

8. The apparatus of claim 7 wherein said build backout module comprises:

a preinstall module configured to acquire environment parameters and non-file objects of the target package and to store the environment parameters and the non-file objects of the target package in the backout package;

a postinstall module configured to store in the backout package a list of deletable files, said deletable files being new program files added to the target package from the patch package; and said postinstall module configured to move pre-repaired existing program files to the backout package from the target package, said pre-repaired existing program files repaired by repairing existing program files in the patch package.

9. The apparatus of claim 8 wherein said backout install module comprises:

a patch checkinstall module configured to restore the environment parameters and non-file objects of the target package from the environment parameters and non-file objects stored in the backout package;

a reinstall module configured to reinstall said pre-repaired existing program objects from the backout package in the target package and a patch postinstall module configured to delete from the target package said new program files identified by the deletable files list in the backout package.

10. A computer program storage medium that is readable by a computing system and that encodes a computer program of instruction for executing a computer process for repairing a software product having existing files that is installed on said computing system using a software-package-add utility, said computer process comprising the steps of:

installing a software-patch-package on said computing system, said software-patch-package containing both replacement-files to selectively replace existing files and new-files and installed using the software-package-add utility;

during installation of said software-patch-package, constructing a restore-software-package which will, when later installed on said computing system, restore said software product to an original state by replacing said replacement-files with said selectively replaced existing files and removing said new-files, said restore-software-package containing data about each replacement-file and new-file that is added to, modified, or deleted from the computing system during said step of installing;

determining if said installation of said software-patch-package has been successful by detecting whether the installed software is operating correctly; and in the event that said installation of said software-patch-package has not been successful, installing said restore-software-package using only said software-package-add utility.

11. The computer program storage medium of claim 10 wherein said computer program process step of installing said software-patch-package comprises the steps of:

checking said software product to verify that said software product to be repaired is on said computing system; and adding patch-files from said software-patch-package into a target package by executing a class-action-script, said patch-files including said replacement-files and said new-files.

12. The computer program storage medium of claim 11 wherein said computer program process step of constructing said restore-software-package comprises the steps of:

acquiring environment parameters and non-file objects of said software product;

copying said environment parameters and said non-file objects into a prototype-file;

copying restore-scripts into said prototype-file for use in restoring said software product;

copying a list of said new-files into a deletes-file;

copying said deletes-file into said prototype-file;

copying a deletes-list from said software-product into said prototype-file, said deletes-list being a list of files replaced by said replacement-files;

moving files that are on said deletes-list from said software-product to said restore-software-package; and saving said prototype-file to said restore-software-package.

* * * * *